United States Patent [19]

Prater

[11] Patent Number: 5,521,640
[45] Date of Patent: May 28, 1996

[54] COLOR IMAGE ARRAY SCANNER WITH HIGH RESOLUTION MONOCHROME MODE

[75] Inventor: James S. Prater, Fort Collins, Colo.

[73] Assignees: AT&T Global Information Solutions Company, Dayton, Ohio; Hyundai Electronics America, Milpitas, Calif.; Symbios Logic Inc., Fort Collins, Colo.

[21] Appl. No.: 332,272

[22] Filed: Oct. 31, 1994

[51] Int. Cl.⁶ ............................................. H04N 9/04
[52] U.S. Cl. ..................... 348/273; 348/247; 348/281
[58] Field of Search ................................ 348/241, 242, 348/247, 250, 251, 222, 239, 252, 253, 273, 281; H04N 9/04

[56] References Cited

U.S. PATENT DOCUMENTS

| | | | |
|---|---|---|---|
| 4,117,510 | 9/1978 | Ohta et al. | 358/44 |
| 4,658,287 | 4/1987 | Chen | 358/48 |
| 4,679,073 | 7/1987 | Hayashi | 348/223 |
| 4,739,495 | 4/1988 | Levine | 348/247 |
| 4,800,288 | 1/1989 | Inagaki et al. | 348/222 |
| 4,876,590 | 10/1989 | Parulski | 348/281 |
| 4,930,006 | 5/1990 | Murayama et al. | 358/44 |
| 5,081,523 | 1/1992 | Frazier | 358/29 |
| 5,157,499 | 10/1992 | Oguma et al. | 358/213.11 |
| 5,170,249 | 12/1992 | Ohtsubo et al. | 358/41 |
| 5,172,220 | 12/1992 | Beis | 348/282 |
| 5,202,767 | 4/1993 | Dozier et al. | 348/273 |
| 5,307,159 | 4/1994 | Hieda | 348/235 |

*Primary Examiner*—Safet Metjahic
*Assistant Examiner*—Jeffrey S. Murrell
*Attorney, Agent, or Firm*—Wayne P. Bailey

[57] ABSTRACT

A solid-state array scanner with a color filter at each pixel sensor is provided to accomplish color scanning of color images with a set of pixels sensors for each color pixel. In addition, a scaler device is provided for selectively scaling the output pixel signal from each pixel sensor to correct for color filter loss when scanning black/white images. Thus, while a set of pixel signals must be combined for each color pixel in color mode scanning, in mono mode scanning of black/white images, the pixel signal from each pixel signal may be used. An address means selectively addresses each solid-state pixel sensor device in the array for readout of the illumination intensity, or pixel signal, sensed by that device. Each pixel sensor will have a given color filter dependent upon the sensor's location in the array. From the address of the pixel sensor, the scaler value to compensate for the color filter in mono mode can be selected. The scaling compensation can be accomplished by changing the reference voltage used in an analog-to-digital (A/D) converter that converts the pixel signals from the analog array output of the pixel sensors to digital values. Alternatively, the scaling compensation can be accomplished by multiplying a digital scaling factor times the pixel digital intensity value from each pixel sensor. Also, the scaling compensation can be accomplished by a programmed digital signal processor.

18 Claims, 6 Drawing Sheets

COLOR IMAGE ARRAY SCANNER WITH HIGH RESOLUTION MONOCHROME MODE

BACKGROUND OF THE INVENTION

1. Field of the Invention

This invention relates to solid-state array scanners for sensing color images and monochromatic images. More particularly, the invention relates to operating such a scanner in a high-resolution monochromatic mode when scanning black/white images such as text documents.

2. Description of Related Art

Solid-state array scanners for scanning color images are well known. These scanners require a set of solid-state photosensitive devices to sense the color of a given picture element (pixel) in the image being scanned. There is a solid-state photosensor assigned to each of the primary colors of a picture element. Typically, this is accomplished by using a cyan, green, yellow or magenta filter with each solid-state photosensor. Other solid-state scanners have used sets of white, red, green and blue filtered solid-state photosensors per color pixel, or simply sets of red, green and blue filtered solid-state photosensors per color pixel.

The solid-state photosensors are usually arranged in a matrix with a plurality of sets of three or four photosensors per set. Each photosensor in a set produces a color-filtered pixel signal. Each color-filtered (red, green or blue, for example) pixel signal from one of the solid-state photosensors in the set is processed outside the array with the other color-filtered pixel signals from photosensors in the set to produce a color pixel signal. This pixel signal is treated as if it originated at each solid-state photosensor in the set. If each solid-state photosensor could be used to produce a distinct monochrome pixel signal when text documents are being scanned, the resolution of the array scanner could be increased by a factor equal to the number of photosensitive devices used to generate a color pixel signal; i.e., typically a factor of 3 or 4.

Exemplary of solid-state image scanners are U.S. Pat. Nos.: 4,117,510 issued to Ohta et al, 4,930,006 issued to Murayama et al, 5,170,249 issued to Ohtsubo et al and 5,307,159 issued to Hieda. Each of these patents teaches a different technique for scanning a matrix of solid-state photosensors with color filters placed over each of the solid state photosensors. Also, the resolution for each of the scanners is set by the number of solid state photosensors grouped to produced the color signals for a color pixel or pel (picture element).

U.S. Pat. No. 4,876,590 issued to Parulski does teach using different sets of color sensors in an array scanner. In normal color scanning, all color sensors are used. In high speed scanning, only the color sensors for a single color are used. Thus, the majority of the sensors go unused during monochromatic scanning.

U.S. Pat. No. 4,658,287 issued to Chen uses each solid-state sensor for each black/white pixel and a set of red, green and blue solid-state sensors for each color pixel. However, Chen removes his color filter when switching from color scanning to black/white scanning. This is not practical in a solid-state scanner where the color filters are integrated into the structure of the scanner array.

To date, there is no solid-state scanner that has an integrated structure with color filters in the scanner array that can be switched from color resolution using a set of solid-state sensors for each color pixel to a higher black/white resolution using each solid-state sensor for each black/white pixel.

SUMMARY OF THE INVENTION

It is an object of this invention to provide a solid-state array scanner switchable between a color mode using "N" solid-state photosensors per pixel to a monochromatic mode using one solid-state photosensor per pixel. Accordingly, the resolution for monochromatic mode scanning is a factor N higher than the resolution for color mode scanning.

In accordance with this invention, the above object is accomplished by a solid-state array scanner with a color filter at each pixel sensor to accomplish color scanning of color images with a set of pixels sensors for each color pixel and further by a scaler device for selectively scaling the output pixel signal from each pixel sensor to correct for color filter loss when scanning black/white images. Thus, while a set of pixel signals must be combined for each color pixel in color mode scanning, in mono mode scanning of black/white images, the pixel signal from each pixel signal may be used. An address means selectively addresses each solid-state pixel sensor device in the array for readout of the illumination intensity, or pixel signal, sensed by that device. The pixel signal from the pixel sensor passes through a scaling device.

In color mode, the scaler (scale factor) is one so that pixel light intensity signal for each sensor is indicative of light passed through the color filter integrally mounted with that sensor. Accordingly, the scaler is set to one for the output from all sensors so as to preserve the color information. In mono (monochromatic or black/white) mode, the scanned image is black/white, and the color filter at each sensor will block a given amount of the white light reflected from the scanned image from reaching the sensor. Therefore, the light intensity signal from the sensor is reduced by a given factor dependent upon the color filter mounted with the sensor. A scaler (scaling factor) is used to amplify the pixel light intensity signal to restore the pixel signal to the level that it would have had under two conditions. The conditions are (1) white light reflected from the scanned image, and (2) no color filter mounted on the sensor.

Each pixel sensor will have a given filter dependent upon the sensor's location in the array. Accordingly, the address of the sensor will define the color of the filter used by the sensor. From the color of the filter, the scaler value to compensate for the filter in mono mode can be selected. The scaling compensation can be accomplished by changing the reference voltage used in an analog-to-digital (A/D) converter that converts the pixel signals from the analog array output of the pixel sensors to digital values. Alternatively, the scaling compensation can be accomplished by multiplying a digital scaling factor times the pixel digital intensity value from each pixel sensor. Also, the scaling compensation can be accomplished by a programmed digital signal processor.

As a further feature of the invention, the scaling factor may be a non-linear function of detected light intensity. A table of digital scaling factors may be stored for each color filter. The table will be selected based on the address of the pixel sensor; i.e., based on the color of the filter at the pixel sensor. Scaler entries in each color table would be selected based on the pixel light intensity signal from the pixel sensor. The scale factor entry selected would then be multiplied with the digital pixel value of the pixel signal to produce a monochromatic pixel value. Alternatively, the entries in the table could be the product of the scale factor and digital pixel value. This would eliminate the multiplication operation.

Other advantages and features of the invention will be understood by those of ordinary skill in the art after referring to the complete written description of the preferred embodiments of the invention in conjunction with the following drawings.

DETAILED DESCRIPTION OF THE INVENTION

Figure 1:
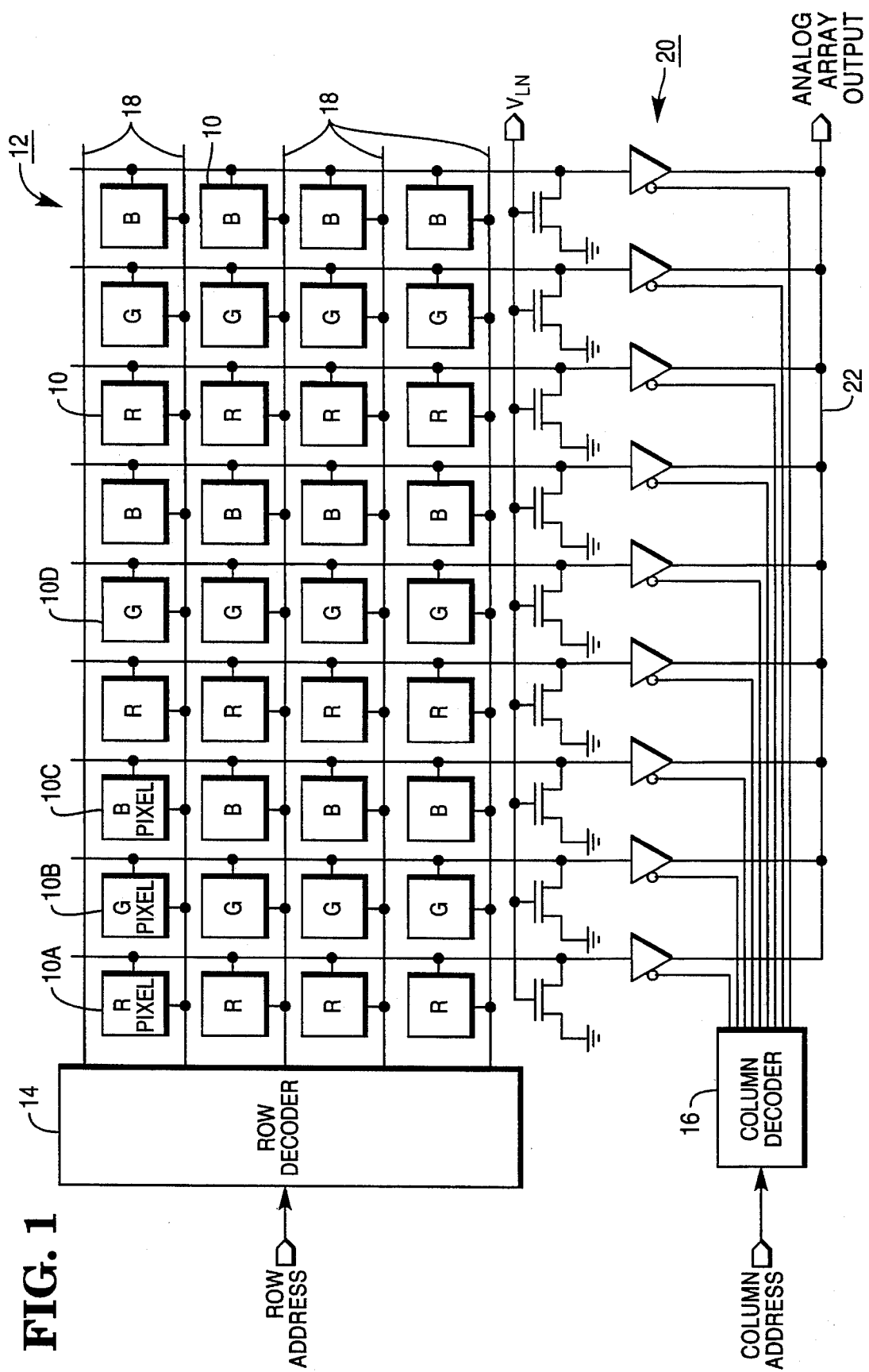
FIG. 1 shows a scanner array used in the preferred embodiment of the invention.

In FIG. 1, the preferred embodiment of the solid-state photosensor array scanner used in the invention is shown. Each of the photosensor circuits 10 in array 12 contain a photosensitive diode covered by a color filter. The pixel sensors are red, green and blue, depending upon the primary color filter covering the photo diode. The color filters are layers permanently laid down on the surface of the solid-state array by a photolithographic process. Thus, the filters are integrated into the array structure and are not removable.

When scanning a color image, a color pixel is made up of signals from pixel sensors 10A, 10B and 10C. In effect, the color pixel is formed by a color pixel window encompassing three pixel sensors. Color pixel window simply refers to processing the three color-filtered pixel signals from pixel sensors, for example 10A, 10B and 10C, into a single color pixel which is assigned the position of the central pixel sensor (pixel sensor 10B for this example). The color pixel window (i.e., the processing of three pixel signals) is indexed one pixel sensor position and a new color pixel is produced. For example, the next color pixel window might encompass pixel sensors 10B, 10C and 10D; the color pixel resulting from processing these three color-filtered signals would be assigned to the position of pixel sensor 10C.

Each pixel sensor is individually addressed through the row decoder 14 and the column decoder 16. The row decoder 14 receives a row address, and enables one of the row lines 18 to enable a row of pixel sensors. The column decoder 16 receives the column address and enables one of the column select amplifiers 20. Accordingly, the row address and column address select for output on the analog array output line 22 the pixel illumination intensity signal from one of the pixel sensors in the array. The array may be of any size and would have a typical color resolution of 320×240 to 1024×1024.

As shown in FIG. 1, the row and column address will address each pixel sensor individually. In color image processing, using an array 12 with primary colors red, green and blue, three successive pixel illumination intensity signals on the analog array output are combined outside the array to generate a color pixel signal. A black-white pixel signal is also available from each sensor in accordance with the invention, but light loss due to the color filter integrated into that pixel sensor structure must be compensated for. Thus, coming out on analog array output line are a series of pixel signals which may be treated individually as black and white pixel signals, or combined in sets of three to generate a color pixel signal.

Figure 2A:
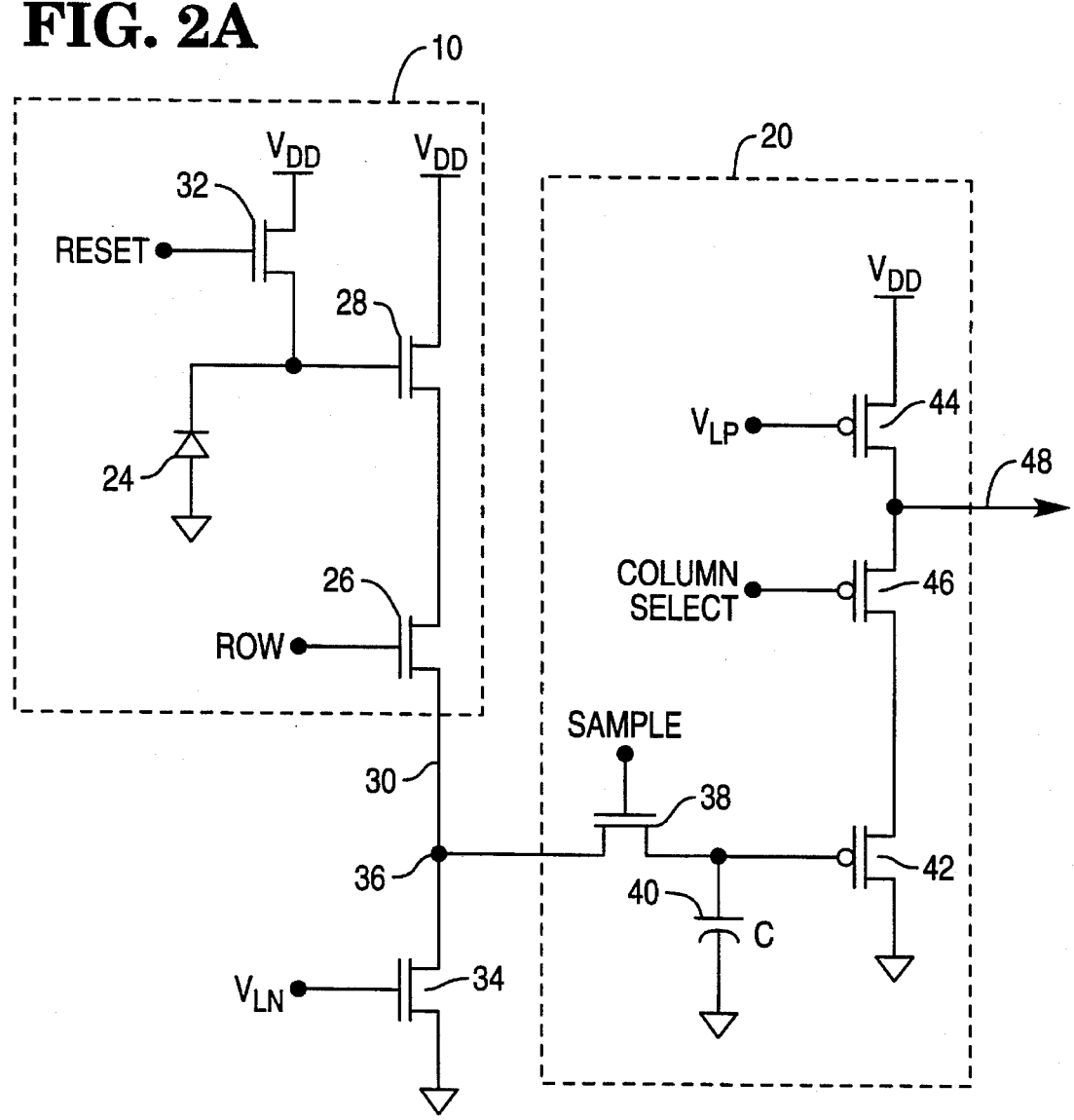
FIG. 2A is a schematic circuit diagram of a pixel photosensor circuit in FIG. 1 in combination with a column select circuit also in FIG. 1.

A circuit schematic for the pixel sensor circuits 10 and the column select circuits 20 is shown in FIG. 2A. Each pixel sensor circuit 10 includes a photodiode 24, and a three n-channel field effect transistors. Transistor 26 is the row access transistor driven by the enabled row line from decoder 14 (FIG. 1). Transistor 28 is the driving transistor that drives the signal from the photodiode 24 onto the column line 30. Transistor 32 is the reset transistor that resets the voltage across the photodiode 24 each time the array is reset or the row containing the pixel sensor is reset.

In operation, the row line to transistor 26 is low to isolate the pixel sensor from the column line 30. At reset time, the reset line on transistor 32 goes high, and almost all of the bias voltage $V_{DD}$ is applied reverse-bias across photodiode 24. After photodiode 24 is charged up, the reset line goes low to turn off transistor 32. Photodiode 24 will hold this reverse-bias voltage until illuminated during the photosensing integration time. In the integration time period when light is being sensed by the photodiode, a portion of the charge across the photodiode is discharged across the photodiode's junction to ground. The portion of voltage across the photodiode 24 at the end of integration time will be a direct measure of the illumination of photodiode 24 during integration time.

At the end of integration time, the row line goes high to enable transistor 26. The voltage across photodiode 24 then drives transistor 28 so that a current is placed on the column line proportional to the light sensed by photodiode 24. Transistor 34 at the bottom of each column line is a load transistor. The bias voltage $V_{LN}$, applied to the gate of field effect transistor 34, biases the transistor to a predetermined resistance or impedance. This load impedance, when driven by driving transistor 28 in the pixel sensor circuit, will place a pixel signal voltage at node 36 which is proportion to the pixel illumination intensity sensed by photodiode 24. Node 36 at column line 30 is the input to the amplifier 20 at the bottom of each column line.

The column select amplifier 20 includes one n-channel field effect transistor 38 and three p-channel field effect transistors. The sample transistor 38 passes the pixel signal from node 36 to capacitor 40 when the sample signal is present. Transistor 42 is a driving transistor that drives the current through load transistor 44 when column select transistor 46 is enabled by the column select signal from column decoder 16 (FIG. 1).

In operation, sample transistor 38 is enabled by the sample signal at the gate of transistor 38 going high. This occurs at the same time as, or shortly after (to allow settling time at node 36), the row signal has enabled transistor 26 to pass the pixel signal voltage to node 36. With transistor 38 enabled, the pixel sensor voltage is then transferred to capacitor 40. After capacitor 40 is charged, or discharged, to the voltage proportional to the pixel signal voltage at node 36, then the sample transistor 38 is turned off by the sample signal going low. In this manner, a row of pixel sensors can have their pixel signal voltages stored in capacitors at each of the column select amplifiers 20 when a row is enabled by the row decoder 14 (FIG. 1). Subsequently, the column decoder will selectively read out the pixel signal voltage stored in each capacitor in each of the column selector circuits 20 by enabling the column select line for the column specified by the column address.

In FIG. 2A, when the column select line goes low, the p-channel transistor 46 is enabled. The voltage on capacitor 40 then acts to bias transistor 42 so that it drives current through load transistor 44. Load transistor 44 is biased by its voltage $V_{LP}$ to provide a load resistance. The output line 48 at load transistor 44 is the pixel illumination signal for the pixel sensor addressed by the row address and the column address. Line 48 is the output line from the column select amplifier and is connected to the analog array output line 22 in FIG. 1.

Figure 2B:
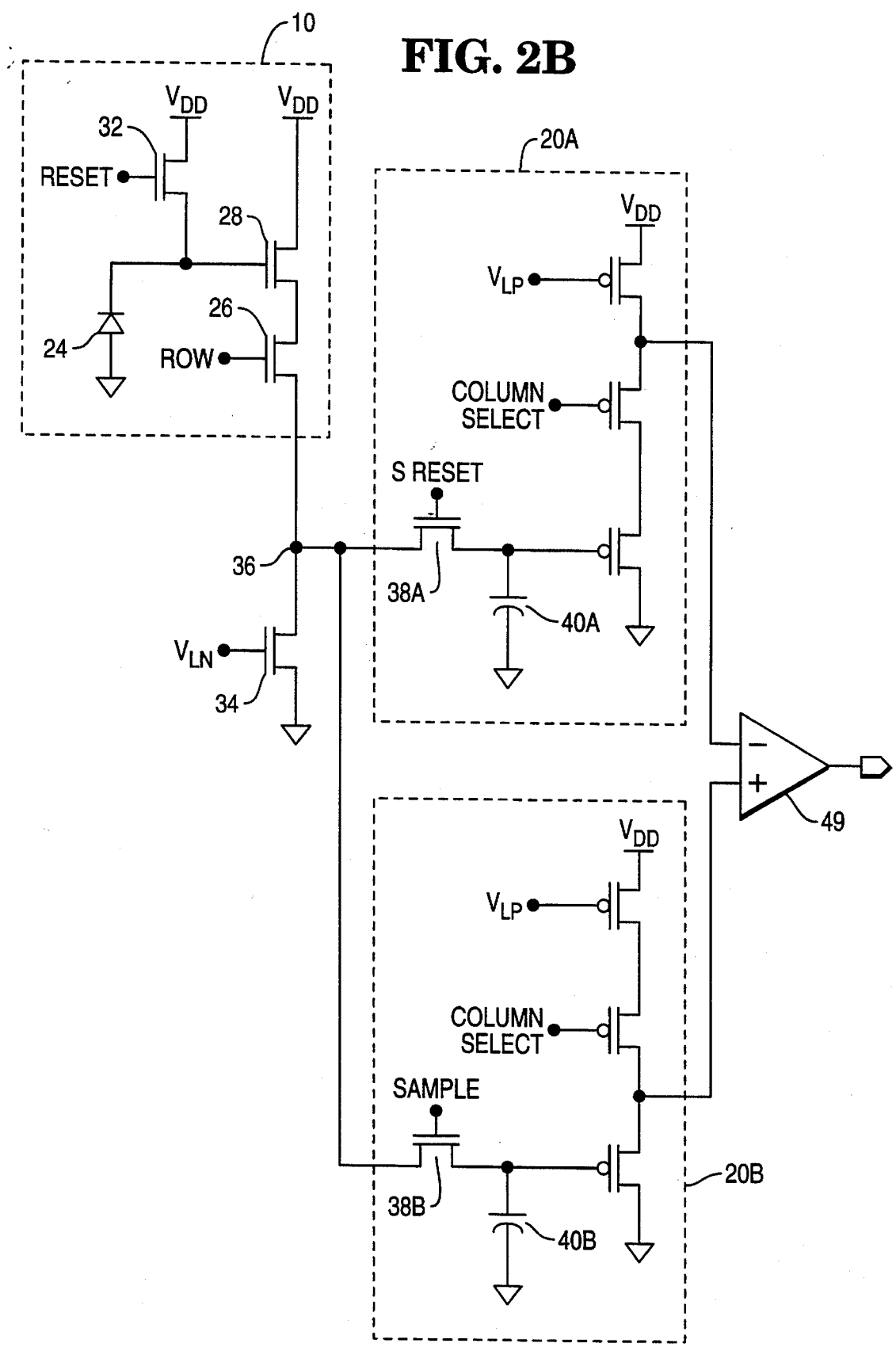
FIG. 2B is a schematic diagram of a pixel photosensor circuit as in FIG. 2A and a differential embodiment of the column select circuits.

FIG. 2B is an alternative differential implementation of the column select circuits 20. The differential implementation is a preferred embodiment as it removes reset noise from the pixel signal. Pixel sensor circuit 10 in FIG. 2B operates with load transistor 34 in the same manner as just described for pixel sensor circuit 10 in FIG. 2A. Similarly, column select circuits 20A and 20B operate in the same manner as just described for column select circuit 20 in FIG. 2A with the following exceptions.

In FIG. 2B, the sample transistor 38A in circuit 20A is switched by a S reset signal, and the sample transistor 38B is switched by the sample signal (same sample signal as in FIG. 2A). Also, the output from column select circuit 20A over line 48A is subtracted by differential amplifier 49 from the output from column select circuit 20B over line 48 B. The result of this operation is that the reset noise is removed from the pixel signal which is now the output of differential amplifier 49.

The timing of the signals in FIG. 2B is as follows. The reset signal at transistor 32 goes high to charge photodiode 24, and goes low after the photodiode is charged. After photodiode 24 is charged and before integration time, the row signal goes high for a first time to enable transistor 26 to place a voltage at node 36 indicating the amount of reset charge on photodiode 24. Immediately after the row signal goes highs, S reset signal goes high to switch on sample transistor 38A. This charges up capacitor 40A to a pixel reset signal voltage proportional to the reset voltage of photodiode 24. The S reset signal goes low, and then the row signal goes low. Now, capacitor 40A holds the pixel reset signal voltage.

After row and S reset go low, photodiode 24 is exposed to the image during integration time. After integration time, the charge on photodiode 24 is proportional to the pixel illumination intensity as discharged from the reset charge on photodiode 24. Row signal goes high for a second time to place a pixel signal voltage on node 36. This pixel signal voltage includes a voltage component proportional to the pixel reset voltage. Immediately after row signal goes high the second time, the sample signal goes high and sample transistor 38B charges capacitor 40B to a voltage proportional to the pixel signal voltage, including the component of the pixel reset voltage. The sample signal goes low and then the row signal goes low. Now, capacitor 40B holds the pixel signal voltage including the pixel reset voltage.

The column select signal occurs sometime after the sample signal goes low.. The column select signal enables the transfer of the pixel reset voltage from capacitor 40A to one terminal of differential amplifier 49. The column select signal also enables the transfer of the pixel signal voltage including pixel reset voltage to the other terminal of differential amplifier 49. The differential amplifier subtracts out the pixel reset signal from the pixel signal, including pixel reset signal. Accordingly, the pixel signal at the output of differential amplifier 49 is free of variations due to the amount of charge placed on photodiode 24 during the resetting of pixel sensor circuit 10.

Figure 3:
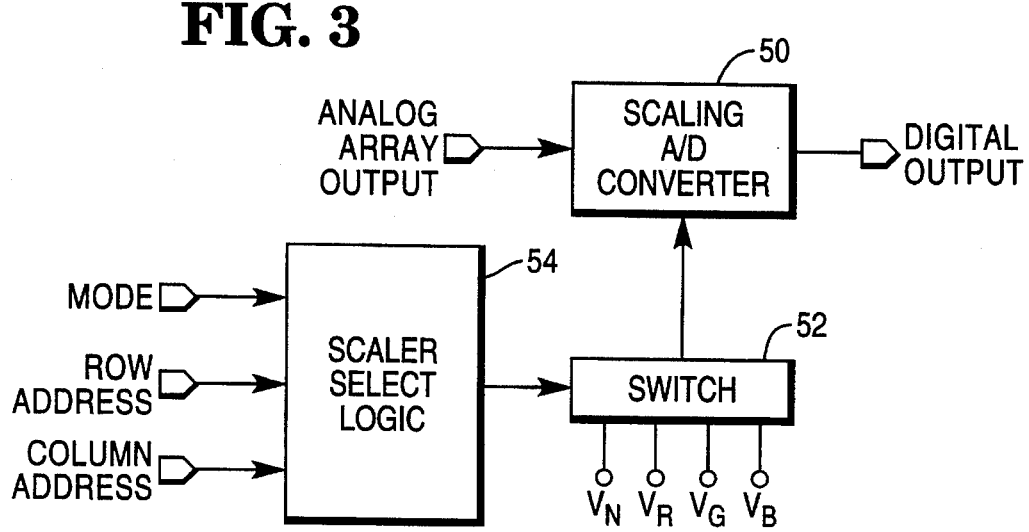
FIG. 3 is a schematic plot diagram of one embodiment for the scaling device to scale the output from each photosensor in FIG. 1.

FIG. 3 illustrates one preferred embodiment for the scaling device attached to the analog array output line. The embodiment in FIG. 3 is an analog scaling embodiment. Scaling is accomplished by changing the reference voltage used by the scaling A/D converter 50. A/D converter 50 is a conventional A/D converter circuit, and it performs a scaling function by using a reference voltage in the A/D conversion that is selectable to scale the conversion. Switch 52 selects one of four voltages $V_N$, $V_R$, $V_G$ or $V_B$ for use as the reference voltage by A/D converter 50. The selection control of the voltage connected to A/D converter 50 is accomplished by scaler select logic 54.

If the mode signal applied to the scaler select logic indicates the scanner is in color mode, then the scaler select logic 54 simply enables switch 52 to pass $V_N$, or the nominal voltage, for the A/D converter. In the color scanning situation, there is no scaling adjustment and, therefore, a reference voltage of $V_N$ is used that converts the analog array output to a digital output with no scaling or multiplying effect.

If a monochromatic, or mono, mode signal is applied to the scaler select logic 54, then the scaler select logic reads the row address and the column address of the pixel signal being read out over the analog array output. The row and column address will specify the color of the filter at the pixel sensor. In other words, by knowing the address of the pixel sensor, the system knows the color of the filter used at the pixel sensor. Scaler select logic 54 then selects the appropriate red, green or blue scaler voltage $V_R$, $V_G$ or $V_B$ to compensate for the color filter.

To illustrate the compensation used during the monochromatic, or black and white, scanning mode, assume that a red color filter reduces the white light passing through the filter by a factor of 4. Accordingly, the pixel signal would be one-fourth of the signal expected if there were no filter present. Therefore, to compensate for the filter, the analog output needs to be multiplied by four. In the embodiment of FIG. 3, the multiplication is accomplished by making $V_R$ for the red filter four times the voltage of $V_N$ or ¼ the voltage of $V_N$ depending on the type of A/D converter used. Similarly, the reference voltage for green and blue filters, $V_G$ and $V_B$, respectively, would be some factor of $V_N$.

Figure 4:
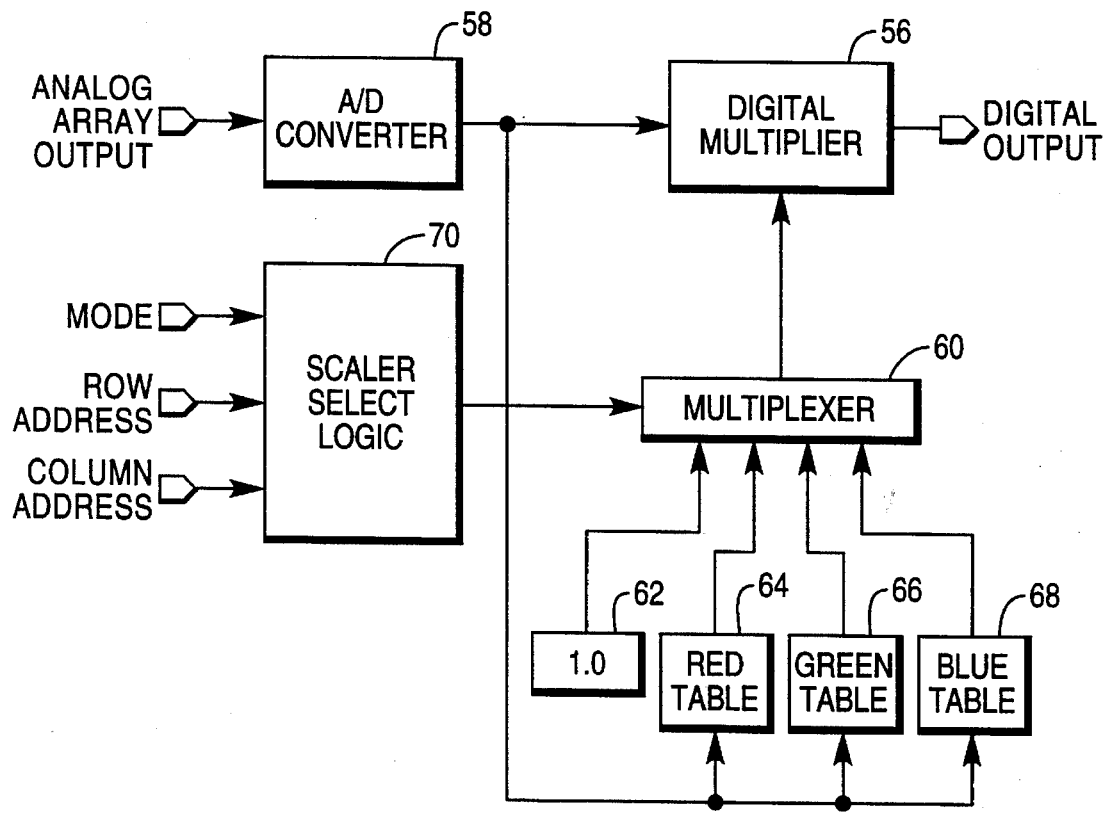
FIG. 4 is an alternative embodiment of the scaling device for using digital multiplication and non-linear scale factors to compensate for the color filter losses in the pixel intensity signal from the photosensors.

In an alternative embodiment in FIG. 4, the scaling and multiplication is accomplished by a digital multiplier circuit 56. Each pixel signal is received over the analog array output line and converted by A/D converter 58 to a digital value. This digital value for the pixel signal is then multiplied in digital multiplier 56 by the appropriate scaling factor to correct for the color filter when the scaling mode is in the monochromatic or black and white mode. Multiplexer 60 switches the digital scaling factor from one of four sources and applies that scale factor to the digital multiplier 56. The nominal scale value 1.0 used for color mode scanning is stored in register 62. The scale factors for the red, green and blue filters are stored in tables 64, 66, and 68, respectively.

Tables of scaling factors are used in the embodiment of FIG. 4, so as to compensate for non-linear characteristics in the filters. The non-linearities in illumination passed by each color filter are a function of the intensity of white light applied to the filter. Scaler select logic 70 operates in the same manner as just described for scaler select logic 54 in FIG. 3.

The operation of the non-linear scaling apparatus in FIG. 4 begins with the application of a pixel signal over the analog array output line to the input of the A/D converter 58. The pixel signal is converted to a pixel digital value and applied to the digital multiplier 56 as the multiplicand. At the same time, the mode signal and the row and column address are applied to the scaler select logic 70 to control the multiplexing switch 60. In color mode, multiplexer 60 passes the value 1.0 from register 62 to digital multiplier 56. The digital pixel value is then multiplied by 1 by digital multiplier 56, and the product is the digital output for that red, green or blue pixel.

In mono mode, where a black/white image is being scanned, scaler select logic 70 controls multiplexer 60 to connect the output from one of the tables 64, 66 or 68, depending on the color filter used at the addressed pixel sensor. The scaler entry selected from the selected table 64, 66 or 68 depends upon the digital value of the pixel signal. Accordingly, the pixel digital value from A/D converter 58 is used to address the tables 64, 66 and 68. In this way, non-linear variation in white light lost through the filters as a function of the intensity of the white light, may be corrected by the scaler entries in the appropriate color filter table. The selected entry from the selected table is passed by multiplexer 60 to act as the multiplier in digital multiplier 56. The digital value of the pixel signal is multiplied by the correct non-linear scaler factor to produce a compensated black/white pixel digital value at the digital output of the digital multiplier 56.

Figure 5:
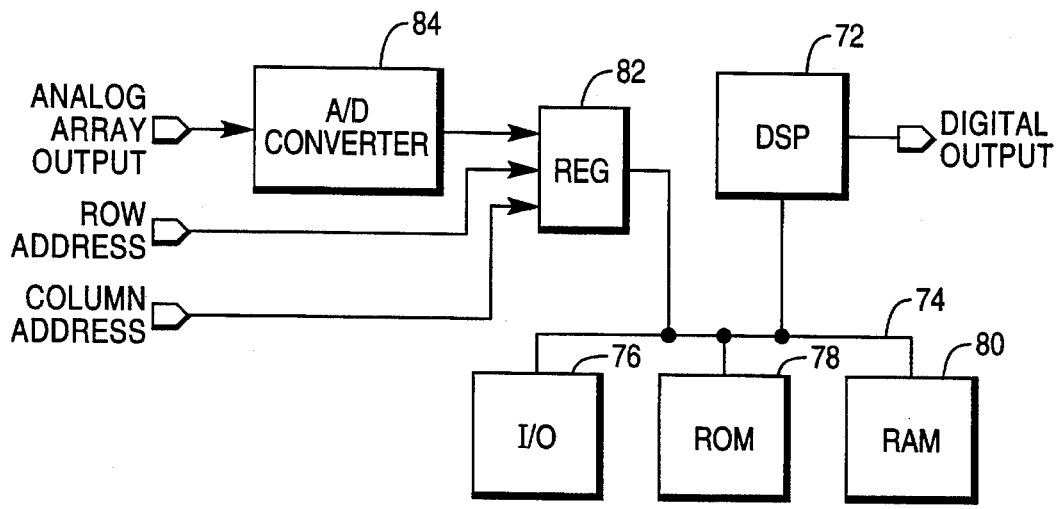
FIG. 5 is a schematic block diagram of a scaling device implemented with a digital signal processor.

In another preferred embodiment of the invention shown in FIG. 5, the scaling apparatus is implemented by a Digital Signal Processor (DSP) 72. DSP 72 is connected to a bus 74. On bus 74, there is an I/O port 76 for loading information or controls into DSP 72, a Read Only Memory (ROM) 78 for storing programs for use by the DSP 72, and Random Access Memory (RAM) 80 for working storage. Also connected to bus 74 is a register 82 that receives the digital value of the pixel signal from A/D converter 84 and the row and column addresses of the pixel sensor producing the pixel signal.

In operation, the pixel signal on the analog array output line is applied to the A/D converter 84 and converted to a digital value for register 82. The row and column addresses for the pixel sensor are also loaded into register 82. DSP 72, under program control, will load the pixel value and row/column addresses in register 82 into RAM 80 working storage. Subsequently, the programmed DSP will perform the various video processing tasks on the pixel digital value. One of the processing tasks will be detecting whether mono resolution mode or color mode processing is required. If mono mode is indicated, as for example, by a signal through the I/O port 76, the operation for scaling the pixel digital value to compensate for the color filter loss is selected.

Figure 6A:
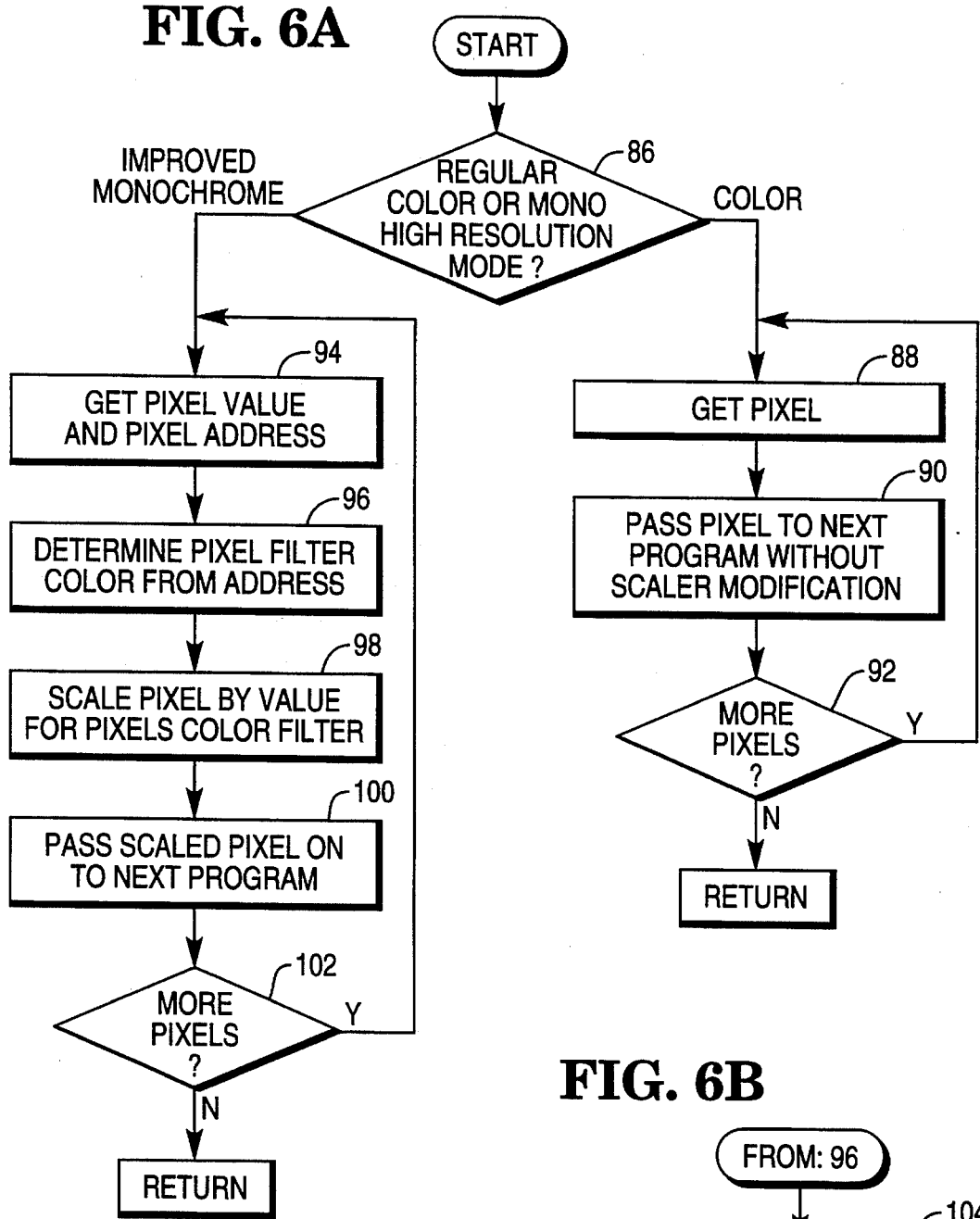
FIG. 6A is a program flow diagram for performing the mode selection and scaling operation in the digital signal processor of FIG. 5.

FIG. 6A shows the computer-implemented steps used by DSP 72 to process the pixel value in color mode or mono high resolution mode. Decision operation 86 tests whether the scanning mode is color mode or mono mode. If the scanning mode is color mode, then operation 88 retrieves the pixel value, and operation 90 passes the pixel value to the next video processing (color processing) program without scaler modification. Decision operation 92 then tests for more pixel values for processing. If there are more pixel values, then the next pixel value is retrieved by step 88. If there are no more pixel values for processing, the program returns to the main control program in the DSP 72.

If decision operation 86 detects that the mono high resolution mode is being used for scanning, the process branches to operation 94. Operation 94 retrieves the pixel value and the pixel address identifying the pixel sensor that generated the pixel value. Operation 96 then selects the filter color used by that pixel sensor from the pixel address. In response to the color of the color filter for the pixel value, step 98 retrieves the scaler for the color, and scales the pixel value by the scaler value for that color. The scaled pixel value, now compensated for the color of the color filter, is passed on to the next video processing program by operation 100. Decision operation 102 then tests for more pixel values to be processed. If there are more pixel values, the program returns to operation 94 to get the next pixel value and pixel address. If there are no more pixel values to be processed, the program returns to the main DSP program.

Figure 6B:
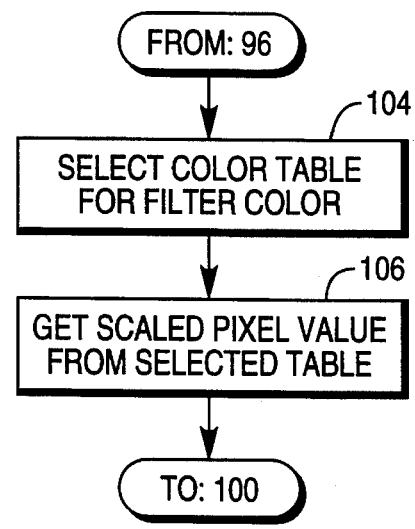
FIG. 6B is an alternative embodiment for the scaling of the pixel value in step 98 of FIG. 6A.

FIG. 6B shows an alternative embodiment to provide a non-linear scaler correction. The process steps in FIG. 6B replace step 98 in FIG. 6A. After step 96 determines the color of the filter from the pixel address, step 104 selects the color table containing the non-linear scaled pixel values for the color filter used at that pixel sensor. Next, operation 106 gets the scaled pixel value corresponding to the pixel signal intensity value retrieved at step 94 (FIG. 1). The scaled pixel value is retrieved from the table selected by operation 104. The process then returns to operation 100 in FIG. 6A to pass the scaled pixel value on to the next video processing program. Non-linear scaling could also be accomplished by storing a scaler in each entry of the selected color table, and adding a step of multiplying the scaler times the pixel value.

Figure 7:
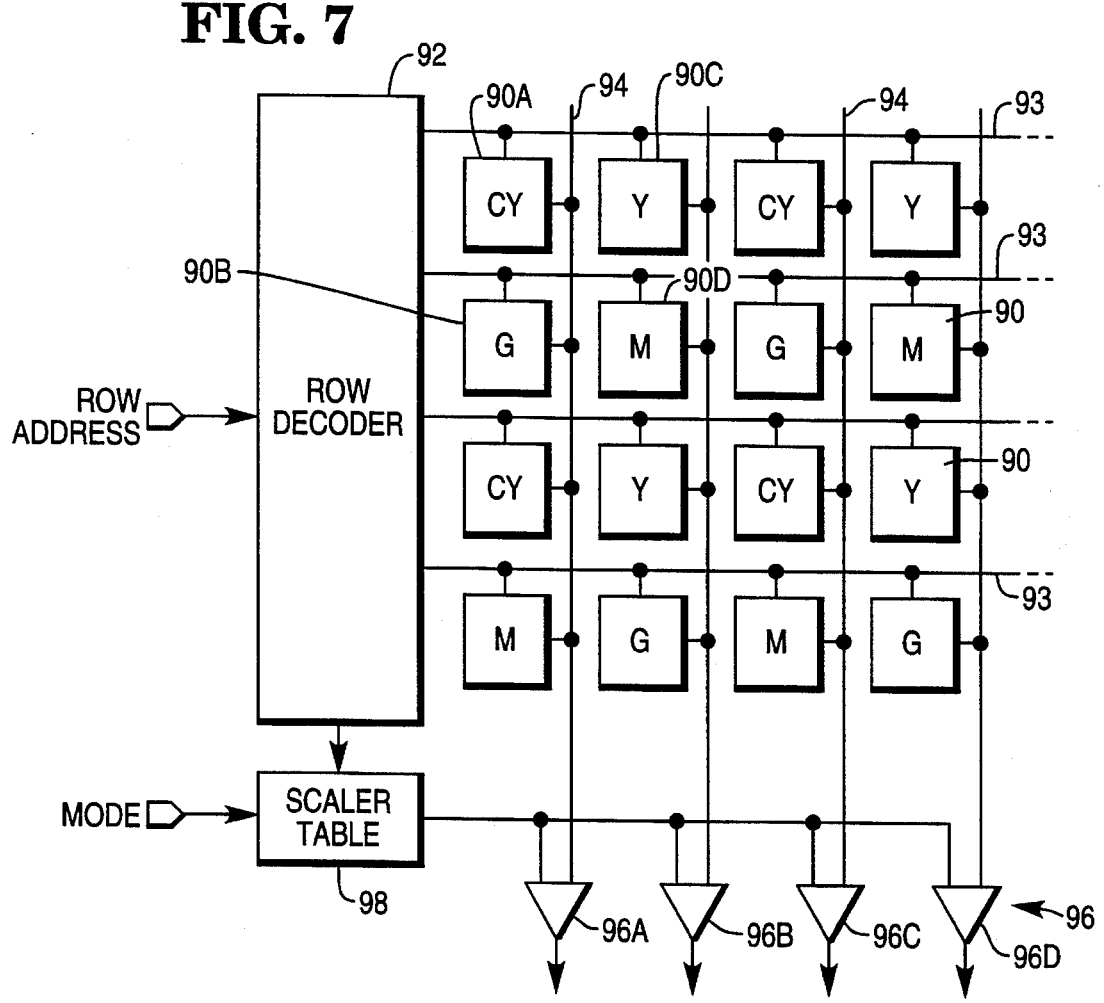
FIG. 7 shows an alternative embodiment of the invention where the solid-state array scanner has scalers on each array column output line.

FIG. 7 illustrates yet another embodiment of the invention using an array with a different color definition space and using amplifiers at the column lines to perform the scaling operation at the output of each column of the scanner array. The color space in the embodiment of the invention in FIG. 7 is defined by cyan, yellow, green and magenta color filters. Each color filter is mounted over a pixel sensor circuit 90. Four pixel sensors make up a color pixel sensing array (for example, pixel sensors 90A, 90B, 90C and 90D form a single color pixel sensor). In monochromatic mode, each of the pixel sensors 90 are used to sense black/white images.

Row decoder 92, in response to a row address input, enables one of the row lines 93. The pixel sensor 90 that is enabled by its row line provides a pixel analog signal on column lines 94. Each column line 94 is connected to the input of an amplifier 96. Scaler table 98 provides a scale factor as the gain control for each of the amplifiers 96.

In operation, a row address is applied to the row decoder 92, enabling all of the pixel sensors in the addressed row. In mono mode, the decoded row is used to also select the color scale factor from the scaler table for each of the amplifiers 96. Assuming that the row address has enabled the top row in FIG. 7 of the array, then scaler table 98 will provide a cyan scaler compensation factor to amplifiers 96A and 96C. At the same time, scaler table 98 will provide a yellow scaler compensation factor for amplifier 96B and 96D. In a color mode, the scaler table would provide a gain factor of 1.0 to all of the amplifiers 96.

While a number of preferred embodiments of the invention have been shown and described, there are many other variations of the elements of the invention that might be used to implement the invention. A MOS photogate and switching transistor might be used as a photosensor. A single slope converter, or a dual slope converter, might be used for analog-to-digital conversion; the single slope or dual slopes would be scaled to scale the pixel value in monochromatic mode. Also, the array could be raster scanned by using vertical and horizontal shift registers in place of the row and column address decoders. It will be appreciated by one skilled in the art, that a number of further variations, or modifications, may be made without departing from the spirit and scope of my invention.

What is claimed is:

1. Solid-state scanning apparatus for scanning color and monochromatic images and operable in color mode for color scanning at a first pixel resolution and operable in a mono mode for monochromatic scanning at a second pixel resolution, said apparatus comprises:

an array of pixel photosensors, with each photosensor most sensitive to a predetermined color of light;

addressing means for addressing pixel photosensors in the array; and scaling means, responsive to said addressing means, for scaling each photosensor pixel signal to compensate for light intensity loss of the addressed pixel photosensor.

2. The apparatus of claim 1 wherein said scaling means comprises:

means responsive to said addressing means for selecting a scaling factor based on the light intensity loss of the addressed photosensor; and means for amplifying the pixel signal by the scaling factor to compensate for the light intensity loss.

3. The apparatus of claim 1 further comprising:

means for producing a pixel light intensity signal for each pixel photosensor addressed by said addressing means.

4. The apparatus of claim 3 wherein said scaling means comprises:

means for converting the pixel light intensity signal to a digital pixel value;

selecting means in color mode for selecting a nominal reference signal as the reference signal used by said converting means when converting the pixel light intensity signal to a digital value; and said selecting means in a mono mode for selecting a scaled reference signal as the reference signal used by said converting means, said scaled reference value selected by said selecting means based on the address of the pixel photosensor producing the pixel light intensity signal.

5. The apparatus of claim 3 wherein said scaling means comprises:

means for converting the pixel light intensity signal to a digital pixel value;

means, in the mono mode and responsive to said addressing means, for selecting a digital scaler value for the pixel value based on the address of the pixel photosensor producing the pixel light intensity signal; and means for multiplying the digital pixel value by the scaler value to produce a scaled pixel value compensated for the light loss at the addressed pixel photosensor.

6. The apparatus of claim 5 wherein said selecting means in color mode selects a digital value of 1.0 irrespective of the pixel photosensor addressed by said addressing means.

7. The apparatus of claim 5 wherein each pixel photosensor has a color filter from a set of color filters defining colors of a color space and the color space set of pixel photosensors has one color filter for each photosensor and at least one photosensor for each of color in the color space, and wherein said selecting means comprises:

means for storing a digital scaler value for each color filter; and means, in the color mode and responsive to said addressing means, for selecting the digital scaler value from said storing means, said selected scaler value being the scaler value for the color filter at the addressed pixel photosensor.

8. The apparatus of claim 5 wherein each pixel photosensor has a color filter from a set of color filters defining colors of a color space and the color space set of pixel photosensors has one color filter for each photosensor and at least one photosensor for each of color in the color space, and wherein said selecting means comprises:

storing means for storing a color table of non-linear, digital scaler values for each color filter, each scaler value in the table being the scaling factor for a particular pixel value;

means, in the color mode and responsive to said addressing means, for selecting the color table in said storing means for the color filter at the addressed pixel photosensor; and said storing means for reading out to said multiplying means a scaler value from the color table selected by said selecting means, the scaler value readout being based on the pixel value from said converting means.

9. The apparatus of claim 1 wherein each pixel photosensor has a color filter from a set of color filters defining colors of a color space and the color space set of pixel photosensors has one color filter for each photosensor and at least one photosensor for each color in the color space, and said scaling means comprises:

means for converting the pixel signal to a digital pixel value;

processing means having a digital signal processor and storage means, said storage means having a color table of digital scaling values for each color filter;

said processing means transferring the digital pixel value and the address of the pixel photosensor producing the digital pixel value to said storage means;

said processing means getting a digital scaling value based on the address of the pixel photosensor and based on the pixel value; and said processing means multiplying the digital pixel value by the scaling value to produce a scaled pixel value indicative of the light intensity at the pixel photosensor for a white light image with no color filter.

10. The apparatus of claim 1 wherein each pixel photosensor has a color filter from a set of color filters defining colors of a color space and the color space set of pixel photosensors has one color filter for each photosensor and at least one photosensor for each color in the color space, and said scaling means comprises:

means for converting the pixel signal to a digital pixel value;

processing means having a digital signal processor and storage means, said storage means having a color table of scaled pixel values for each color filter;

said processing means transferring the digital pixel value and the address of the pixel photosensor producing the digital pixel value to said storage means; and said processing means getting a scaled pixel value a color table in said storage means based on the address of the pixel photosensor and the pixel value, the scaled pixel value indicative of the light intensity at the pixel photosensor for a white light image with no color filter.

11. Solid-state scanning apparatus for scanning color and monochromatic images and operable in color mode for color scanning at a first pixel resolution combining color signals from a color space set of pixel photosensors and operable in a mono mode for monochromatic scanning at a second pixel resolution with a monochromatic pixel signal for each distinct pixel photosensor, said apparatus comprises:

an array of pixel photosensors with each photosensor most sensitive to a predetermined color of light in the color space set and having a predetermined light intensity loss for white light;

addressing means for addressing each pixel photosensor in the array;

means for producing a pixel light intensity signal for each pixel photosensor addressed by said addressing means; and scaling means in the mono mode responsive to said addressing means, said scaling means for scaling each pixel signal to compensate for the predetermined light intensity loss of the addressed pixel photosensor whereby a monochromatic pixel signal is produced for each pixel photosensor when scanning monochromatic images.

12. The apparatus of claim 11 wherein said scaling means comprises:

means responsive to said addressing means for selecting a scaling factor based on the light intensity loss of the addressed photosensor; and means for amplifying the pixel signal by the scaling factor to compensate for the predetermined light intensity loss.

13. The apparatus of claim 11 wherein said scaling means comprises:

means for converting the pixel signal to a digital pixel value;

selecting means in color mode for selecting a nominal reference signal as the reference signal used by said converting means when converting the pixel signal to a digital value, said nominal value having no scaling effect on the pixel value produced by said converting means; and said selecting means in a mono mode for selecting a scaled reference signal as the reference signal used by said converting means, said scaled reference value selected by said selecting means based on the address of the pixel photosensor producing the pixel signal so as to scale the converting function performed by said converting means and thereby produce a scaled pixel value to compensate for the light loss at the addressed pixel photosensor.

14. An array scanner for scanning color images in a color scanning mode and for scanning black/white images in a mono (black/white) mode, said array scanner having a matrix of photosensor circuits, each photosensor having a color filter, a method for producing a monochromatic signal corrected for white light illumination when the array scanner is in the mono mode, said method comprising the steps of:

detecting the mono mode;

in the mono mode, determining the color filter at each photosensor and a scaling factor for each color filter; and in the mono mode, scaling a color-filtered pixel signal from each photosensor with the scaling factor to produce a black/white pixel signal compensated for light loss of the color filter.

15. The method of claim 14 wherein said determining step comprises the steps of:

identifying each color-filtered pixel signal with the photosensor in the array producing the color-filtered signal and thereby the color filter causing the light loss; and selecting a scaling factor for each color-filtered signal based on the color filter identified by said identifying step.

16. The method of claim 14 wherein said determining step comprises the steps of:

identifying each color-filtered pixel signal with the photosensor in the array producing the color-filtered signal and thereby the color filter causing the light loss;

first selecting a color table of non-linear scaling factors for the color filter causing the light loss, said table including a plurality of scaling factors; and second selecting from the color table, selected by said first selecting step, a scaling factor based on the color-filtered pixel signal.

17. The method of claim 14 wherein said determining step comprises the steps of:

identifying each color-filtered pixel signal with the photosensor in the array producing the color-filtered signal and thereby the color filter causing the light loss;

first selecting a color table of scaled pixel signals for the color filter causing the light loss, said table including a plurality of black/white pixel signal values compensated for light loss caused by the color filter; and second selecting from the color table, selected by said first selecting step, a black/while pixel signal value based on the color-filtered signal.

18. Solid-state scanning apparatus for scanning color and monochromatic images and operable in color mode for color scanning at a first pixel resolution and operable in a mono mode for monochromatic scanning at a second pixel resolution, said apparatus comprises:

a plurality of pixel photosensors comprising a color space set of photosensors whose output pixel signals when combined form a color pixel signal for the color space set of photosensors;

addressing means for addressing the pixel photosensors; and scaling means, responsive to said addressing means, for scaling the output pixel signals when operable in the mono mode.

\* \* \* \* \*